(12) United States Patent
Haustein et al.

(10) Patent No.: US 8,627,126 B2
(45) Date of Patent: Jan. 7, 2014

(54) OPTIMIZED POWER SAVINGS IN A STORAGE VIRTUALIZATION SYSTEM

(75) Inventors: Nils Haustein, Mainz (DE); Ulf Troppens, Mainz (DE); Daniel James Winarski, Tucson, AZ (US); Rainer Wolafka, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 13/346,339

(22) Filed: Jan. 9, 2012

(65) Prior Publication Data
US 2012/0179928 A1 Jul. 12, 2012

(30) Foreign Application Priority Data
Jan. 12, 2011 (EP) .................................. 11150681

(51) Int. Cl.
*G06F 1/32* (2006.01)

(52) U.S. Cl.
USPC ............................. 713/320; 711/165; 713/324

(58) Field of Classification Search
USPC .................................... 711/165; 713/320, 324
See application file for complete search history.

(56) References Cited

U.S. PATENT DOCUMENTS

| 7,174,471 B2 | 2/2007 | Komarla et al. |
| 8,321,629 B2 * | 11/2012 | Hayashi et al. ............... 711/114 |
| 2007/0208921 A1 | 9/2007 | Hosouchi et al. |
| 2009/0207520 A1 | 8/2009 | Golasky et al. |
| 2010/0332882 A1 * | 12/2010 | Nayak et al. .................. 713/324 |

FOREIGN PATENT DOCUMENTS

WO  WO2009032776 A2  3/2009

* cited by examiner

*Primary Examiner* — Albert Wang
(74) *Attorney, Agent, or Firm* — Griffiths & Seaton PLLC

(57) ABSTRACT

Various embodiments for optimized power savings in a storage virtualization system are provided. First meta data for physical resources which describes a power status of a storage resource in one of a powered-on/read-write, powered-on/read only, and powered-off power state is created. Second meta data for each of the physical storage resources which determines an actual performance of the physical storage resources and which supports optimization of a powering-on and a powering-off of the physical storage resources is created. A write request from one of a host and application to logical and virtual storage resource is executed.

19 Claims, 6 Drawing Sheets

| Process | Trigger | Key characteristics | Essential parameters |
|---|---|---|---|
| Read request (200) | Event driven (application sends read request) | • Serves read requests<br>• Enhancement of prior art read processing<br>• May power on a storage device (set status to powered-on/read-write) | Read<br>• $status_i$<br><br>Update<br>• $status_i$<br>• $tr_i$ |
| Write requests (300) | Event driven (application sends write request) | • Serves write requests<br>• Enhancement of prior art write processing<br>• May change mapping of logical storage to physical storage to prevent powering-on of storage devices<br>• May trigger process 400 | Read<br>• $status_i$<br><br>Update<br>• $status_i$ |
| Powering-on storage devices (400) | Background process or event driven (e.g. triggered by process 300, storage device reaches 100% utilization) | • Change status of storage devices to meet target for aggregated write performance<br>• May power-on storage devices if their status changes and status was powered-off<br>• Inventive process | Read<br>• $status_i$<br>• $u_i$<br>• $p_i$<br><br>Update<br>• $status_i$ |
| Powering-off storage devices (500) | Background process or event driven (e.g. power consumption threshold reached) | • May power-off storage devices if current achievable aggregated write performance is above target for aggregated write performance<br>• Changes status of storage devices which are powered-off<br>• May consolidate active regions of multiple storage devices with low activity to single storage device by migrating active datasets in order to power off storage devices with low activity<br>• Inventive process | Read<br>• $status_i$<br>• $u_i$<br>• $p_i$<br>• $tr_i$<br>• $to_i$<br>• $a_i$<br>• $at_i$<br><br>Update<br>• $status_i$ |

FIG. 2 A

OPTIMIZED POWER SAVINGS IN A
STORAGE VIRTUALIZATION SYSTEM

PRIORITY CLAIM

This application claims priority to European Patent Application No. 11150681.2, filed Jan. 12, 2011, which is hereby incorporated by reference in its entirety.

BACKGROUND OF THE INVENTION

1. Field of the Invention

The present invention relates to computers, and more specifically, to an optimized power savings in a storage virtualization system.

2. Description of Related Art

Prior art in the field of storage virtualization improves classical storage management requirements such as tiered storage, hierarchical storage management (HSM), and information life-cycle management (ILM). New methods are required to reduce the power consumption of virtualized storage systems.

SUMMARY OF THE DESCRIBED
EMBODIMENTS

Storage virtualization means the pooling of physical storage resources from multiple network storage resources into what appears to be a single storage resource that is managed from a central console. Storage virtualization may be used in a storage area network (SAN).

Storage virtualization moves the storage virtualization functions from the servers (volume manager, file systems) and disk subsystems (caching, RAID, instant copy, remote mirroring, LUN masking) into the storage network. This creates a new storage virtualization system which, as a result of its positioning in the storage network, spans all servers and storage systems. This new virtualization in the storage network permits the full utilization of the potential of a storage network with regard to the efficient use of resources and data, the improvement of performance and protection against failures. It is object of the present invention to provide an improved method and system for power saving in a storage virtualization system without violating the performance requirements.

The present invention teaches a novel method for optimized power saving in storage virtualization system. The storage virtualization system comprises a virtualization controller, which manages storage capacity on storage resources and presents them as logical or virtual storage resources to hosts and applications, and a plurality of storage resources, mapping table for mapping virtual resources to physical storage resources. The power-on or power off of the physical resources is optimized by the inventive method which comprises the steps of: creating first meta data for each physical resource which describes the power status of said storage resource in "powered-on/read-write", "powered-on/read-only", "powered-off", creating second meta data for each physical storage resource which determines the actual performance of said physical storage resources and which supports the optimization of powering-on and powering-off of physical storage resources, executing write request from the host or application to logical or virtual storage resource by the steps of: determining current physical target storage resource by evaluating said mapping table, determining the power-status of said physical storage resource based on said meta data, selecting a new target physical storage resource which is in the power state "powered-on/read-write" if the said target physical storage resource is "powered-off" or "powered-on/read-only", updating said mapping table to map the virtual resource to said new physical target resource, configuring the optimized set of physical storage resources to be in power status "powered-on/read-write" by creating a performance target for said set of physical storage resources in power state "powered-on/read-write" and determining the actual performance of said set of physical storage resources in power state "powered-on/read-write" and first background process which initiates a power-on on one or more physical storage resources if said performance target is below said determined current performance and a second background process which initiates a power-off of one or more physical storage resources if said performance target is above said determined current performance.

In a preferred embodiment the second meta data describes characteristics of each physical storage resource including power consumption, performance, time stamp of last read request, time-out interval for the last read request, capacity, utilization, activity ratio, activity threshold, wherein said activity ratio is defined as the amount of data which is read from physical storage resource within the time-out interval of the physical storage resource (active data).

In a further embodiment the first background process includes the steps of: selecting one physical storage resource in power state powered-off or in power state "power-on/read-only", initiating the powering-on of said selected physical storage resource if said power-status is powered-off, setting power-status of said selected storage resource to "powered-on/read-write", Updating current performance, and repeating said steps if the target performance is still below the updated current performance.

In another further embodiment the second background process includes the steps of: selecting one physical storage resource which is in power state "powered-on/read-write" and which exceeded the time-out interval for the last read request, setting the power status of said selected physical storage resources to powered-off, initiating the powering-off of aid selected physical resources, updating current performance, and repeating said steps if the target performance is still above said current performance.

In a further embodiment the second background process includes the steps of: selecting a physical storage resource in power state "powered-on/read-write" which current activity ratio is below its activity threshold, setting the power status to "powered-on/read-only", migrating the active data to another physical storage resource which is in power state "powered-on/read-write", updating said mapping table to map the virtual resource to said new physical target resource, and powering-off selected physical storage resource.

In general, in the preferred embodiment of the present invention the storage virtualization system runs two kinds of processes. Event driven processes serve read and write requests of the application systems and other time critical tasks. In addition to that a storage virtualization system runs background tasks like data scrubbing, data reorganization and other maintenance tasks. This invention describes potential modifications of read and write requests to keep as many storage resources powered-off as possible. Nevertheless, event driven processes can change the power-state of a storage resource, for instance, a read request can enforce a storage resource to be powered on. Therefore, the amount of powered-on and powered of storage resources changes of the time. Therefore, this invention introduces two new back ground processes for powering-on and powering-off storage resources to optimize the amount of powered on storage resources to satisfy certain performance requirements. Furthermore, this invention describes a new migration policy for migrating active data regions to a single storage resource to increase the number of storage resources, which are eligible for being powered-off.

The key characteristics of the inventive method are "powered-on/read-only", summarized as follows:

The storage virtualization system maintains for each storage resource a power state. The power state of a storage resource can be "powered off", "powered-on/read-only" read access allowed, "powered-on/read-write" access allowed ("powered-on/read-write"):

Intercepting write access to powered-off storage resources and to "powered-off/read-only" storage resources. Instead of powering-on the target storage resource, the storage virtualization system updates the mapping table from virtual storage units to local storage units and thus redirects the write operation to a storage resource which is already in the state "powered-on/read-write" access allowed, Providing a process for powering on storage resources to satisfy service level agreements (SLAs) regarding guaranteed performance, whilst trying to minimize the power consumption, Providing a process for powering off storage resources to reduce the power consumptions, whilst guaranteeing that service level agreements (SLAs) regarding guaranteed performance are still met, and Providing a method of migrating the active regions with read access to another storage resources to power-off the freed-up storage resource.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

FIG. 1 B shows the prior art process flow for serving a read request of host computer;

FIG. 2 B shows the inventive write process;

FIG. 2 C shows the inventive process flow for increasing the number of powered-on resources;

FIG. 2 D shows the inventive processing flow for decreasing the number of powered-on resources; and FIG. 2 E shows the enhanced inventive storage virtualization system.

The detailed description explains the preferred embodiments of the invention, together with advantages and features, by way of example with reference to the drawings.

DETAILED DESCRIPTION OF CERTAIN EMBODIMENTS

The architecture of storage virtualization entities can be distinguished in symmetric (in-band) virtualization and asymmetric (out-band) virtualization. Furthermore both architectures can provide block-level virtualization and file-level virtualization.

Figure 1:
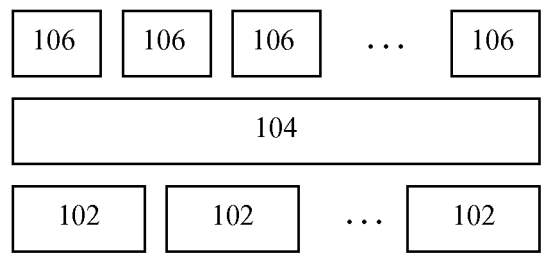
FIG. 1 A shows a prior art architecture for storage virtualization in the network.
Figure 1:
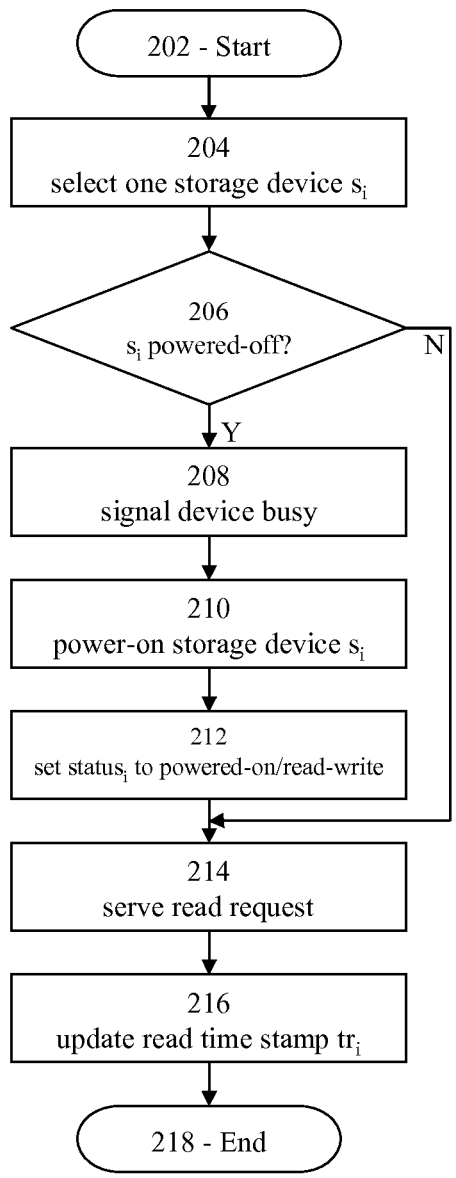

FIG. 1 A shows a prior art architecture for storage virtualization in the network. The storage resources 102 provide the storage capacity for storing data. A storage resource 102 can be, for instance, a single disk drive or a complete RAID array comprising multiple disk drives. The storage virtualization system 104 spans all storage resources 102 and provides central management for all storage resources. The storage virtualization system 104 assigns storage capacity to the host computers 106 for writing and reading data.

The prior art architecture presented in FIG. 1 A covers a broad range of real life architectures including, but not limited to, symmetric and asymmetric virtualization as well as block-level and file-level virtualization.

The storage virtualization system 104 maps logical storage capacity to physical storage capacity. Depending on the virtualization type, logical storage capacity is organized in blocks, files, parts of files, records of a relational database, or any other logical container for addressing data. The storage virtualization system 104 maintains a mapping table for mapping such logical resources to physical resources. Physical resources can be blocks, files, parts of files, records of a relational database, or any other physical container for addressing data.

Some storage techniques maintain one or more physical copies for each logical copy. For instance the replication of files of the IBM® GPFS file system keeps two physical copies of each file written by an application. The RAID levels RAID 1 and RAID 10 keep two copies of each block written by an application. For reading data it is sufficient to access only one physical copy of the data. Thus the storage resources 102 which keep such copies can be powered-off.

The power saving system and methods taught in this invention are implemented in the storage virtualization system 104. The storage virtualization system 104 can for example be represented by a disk control unit such as IBM® DS8000 or by a storage virtualization system such as IBM® SAN Volume controller.

This present invention teaches novel methods for efficient powering-on and powering-off of storage resources. For the implementation of processes 200, 300, 400, and 500 the storage virtualization system 104 uses a repository to retain meta data supporting this invention. The meta data items are described below. Let $s_1, s_2, \ldots, s_n$, be the n storage resource 102 of that configuration. Then we define $pc_i$ as the power consumption of storage resource $s_i$
$p_i$ as the performance of storage resource $s_i$
$status_i$ as the status of storage resource $s_i$
$tr_i$ as the time stamp of the last read request to storage resource $s_i$
$to_i$ as the time out interval for the last read request to storage resource $s_i$
$c_i$ as the capacity of storage resource $s_i$
$u_i$ as the utilization of storage resource $s_i$
$a_i$ as the activity ratio of storage resource $s_i$
$at_i$ as the activity threshold of storage resource $s_i$ The power consumption $pc_i$ models the power consumption of given storage resource. In one embodiment the power consumption is specified in Watt. In an alternate embodiment the power consumption is represented by a rational number between zero and one. In one embodiment the power consumption weight is configured by the administrator. In an alternate embodiment the storage virtualization system 104 assigns the power consumption weight based on built-in policies.

The performance $p_i$ models the performance of a given storage resource. In one embodiment the performance is specified in MByte/s. In an alternate embodiment the performance is specified in IOPS/s. In an alternate embodiment the performance is represented by a rational number between zero and one. In one embodiment the performance weight is configured by the administrator. In an alternate embodiment the storage virtualization system 104 assigns the performance weight based on built-in policies. In an alternate embodiment the storage virtualization system 104 measures the performance capability of a given storage resource and assigns the performance weight automatically.

The status $status_i$ of the storage resource $s_i$ can assume the following values:
"powered-on/read-write" the storage resource is "powered-on/read-write" read-write-requests are allowed,
"powered-on/read-only" the storage resource is powered-on, read-requests are allowed,
powered-off the storage resource is powered-off The status powered-on is used to refer to a status which is either "powered-on/read-write" or "powered-on/read-only". The status $status_i$ of a storage resource $s_i$ is updated by the processes introduced below.

The time stamp of the last read request $tr_i$ to storage $s_i$ keeps track of the point in time for the last read access to storage resource $s_i$. The time stamp $tr_i$ of the last read access to a storage resource $s_i$ is updated by the processes introduced below.

The time out interval $to_i$ for the last read request specifies the amount of time which must pass before the storage resource $s_i$ becomes eligible for being powered-off. In one embodiment the time out interval $to_i$ for the last read request is configured by the administrator. In an alternate embodiment the storage virtualization system 104 assigns the time out interval $to_i$ for the last read request based on built-in policies.

The capacity $c_i$ of a storage resource represents capacity of a storage resource $s_i$. In the preferred embodiment the capacity is specified in MByte. The utilization $u_i$ of a storage resource represents the utilization ratio of a storage resource. In the preferred embodiment the utilization ratio $u_i$ is represented by a rational number between zero and one were it is calculated by dividing the amount of used storage capacity of a storage resource by the amount of total storage capacity $c_i$ of a storage resource $s_i$.

The activity ratio $a_i$ represents the recent activity on a storage resource $s_i$. In the preferred embodiment the activity ratio is defined as the amount of data read from a storage resource $s_i$ within the time-out interval $to_i$ divided by the overall storage capacity $c_i$ of storage resource $s_i$.

The activity threshold $at_i$ of storage resource $s_i$ defines the maximal activity ratio $a_i$ for a storage resource $s_i$ to become eligible for being powered-off.

Based on these parameters the maximal write performance can be defined as $$P_{max} = \Sigma p_i$$

and the currently achievable write performance can be calculated as $$P_{cur} = \Sigma p_i \text{ where } status_i \text{ "powered-on/read-write" and } u_i < 100\%.$$

Furthermore we define
$P_{SLA}$ as the performance requirement for the aggregated write performance.
The inventive methods introduced by this invention keep the relation $$P_{SLA} << P_{cur} << P_{max}$$

to power of as much storage resources as possible whilst guaranteeing a certain performance target for aggregated write performance.

FIG. 2A shows how these new parameters are used to extend a prior art storage virtualization system 104 to provide inventive power saving techniques which are disclosed by this patent application. Next we describe the processes according to this invention implemented in the storage virtualization system 104 and enabling power saving in a storage system.

FIG. 1B shows the prior art process flow 200 for serving a read request of host computer 106. The process 200 starts in step 202 where the read command such as a SCSI READ(10) command from a host system 106 is received by the storage virtualization system 104. Upon reception of that read command the process flows to step 204.

In step 204 a storage resource for reading the requested data is selected. Thereby prior art is used to determine if one or more copies of the requested data exists. The storage virtualization system 104 may perform copy, mirror or replication operations according to prior art creating copies for all data. Thereby the storage virtualization system 104 keeps track of all associated data copies. This mechanism is used here to determine all copies for the data requested as part of the read command, which has been received in step 202. If more than one copy exists on distinct storage resources, the storage virtualization system 104 selects only one storage resource to serve the read request. Thereby different embodiments are used. In one embodiment the copy is selected which resides on a storage resources 102 in powered-on state. In the case that multiple copies reside on powered-on storage resources, the virtualization 104 typically takes the time stamp $tr_i$ for the last read access into account: It selects the most recently used storage resource 102 to keep the current read activity of the whole infrastructure on as few storage resources 102 as possible. In an alternate embodiment the virtualization engine selects the storage resource based on activity. For performance reasons, for instance if the storage resource is a "hot spot" with a huge amount of pending I/O requests, the storage virtualization system 104 may also select a different storage resource in powered-on state. In yet an another embodiment the selection of the storage resource can take additional environmental conditions into account such as the parameters $pc_i$, $p_i$, $status_i$, $tr_i$, $to_i$, and $at_i$ defined above. For example it may select the storage resource with the least utilization $u_i$. If none of the storage resources storing a copy of the requested data is powered on then the storage resource with the primary data copy is selected. After the selection of a storage resource $s_i$ for reading the physical copy of the data the process flows to step 206.

In step 206, the storage virtualization system 104 checks whether the status of the storage resource $s_i$ which was selected in step 204 to read the data is powered-off. If the decision in step 206 evaluates to NO, the storage resource 102 is powered-on and the process continues at step 214 which is explained later. If the decision in step 206 evaluates to YES, the storage resource 102 is powered-off and the process flows to step 208.

In step 208, the storage virtualization system 104 uses prior art to signal the host computer 106 that the storage resource $s_i$ which was selected in step 204 to read the data is busy to gain some time for powering-on the storage resource $s_i$. For instance, for a block I/O SCSI read request, the storage virtualization system 104 can respond a SCSI READ command received in step 202 with a SCSI status: Device Busy. The flow continues at step 210.

In step 210, the storage virtualization system 104 powers-on the storage resource $s_i$ which was selected in step 204 to read the data. The flow continues at step 212.

In step 212, the storage virtualization system 104 sets the status $status_i$ of the storage resource $s_i$ which was selected in step 204 to read the data to powered-on/read-write. The flow continues at step 214.

In step 214, the storage virtualization system 104 reads the data from the storage resource $s_i$, which was selected in step 204 to read the data, and serves the read request of host computer 106. The flow continues at step 216.

In step 216, the storage virtualization system 104 updates the last read time stamp $tr_i$ of the storage resource $s_i$, which was selected in step 204 to read the data. The process 200 ends in step 299.

Figure 2:
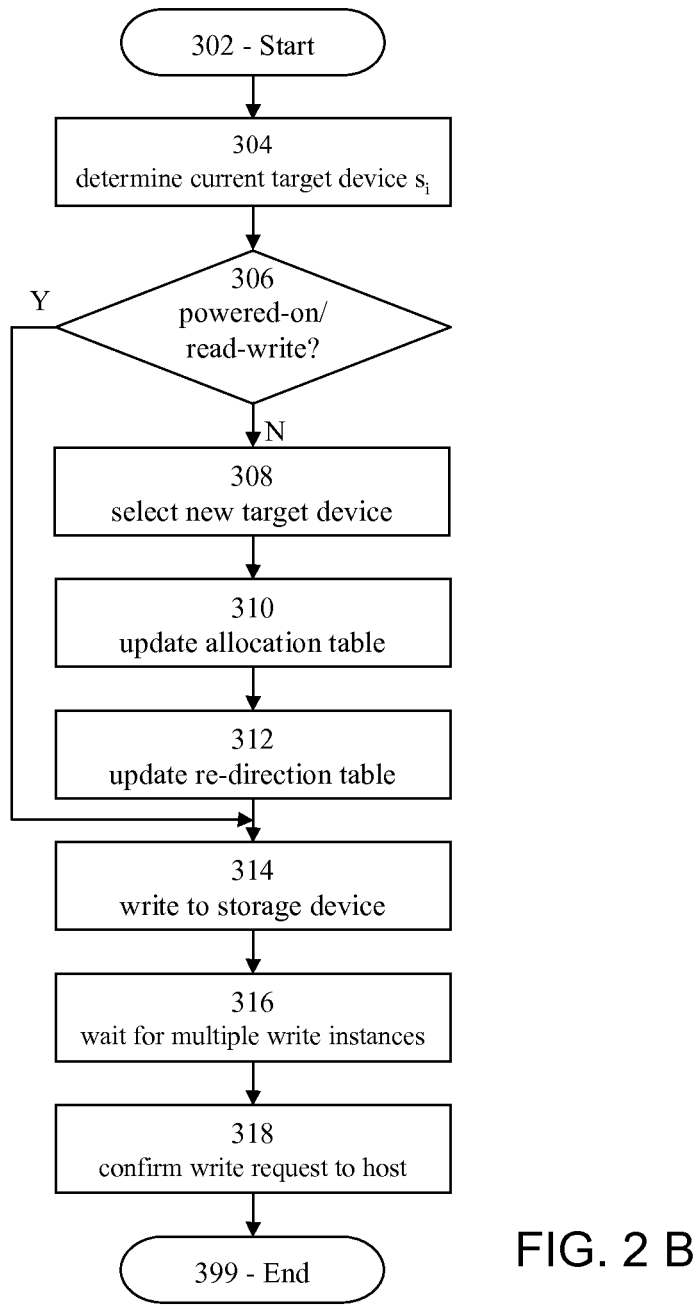
FIG. 2 A shows a table with new parameters which are used to extend a prior art storage virtualization system and to provide the inventive optimized power saving for the storage virtualization system according to the present invention.
Figure 2:
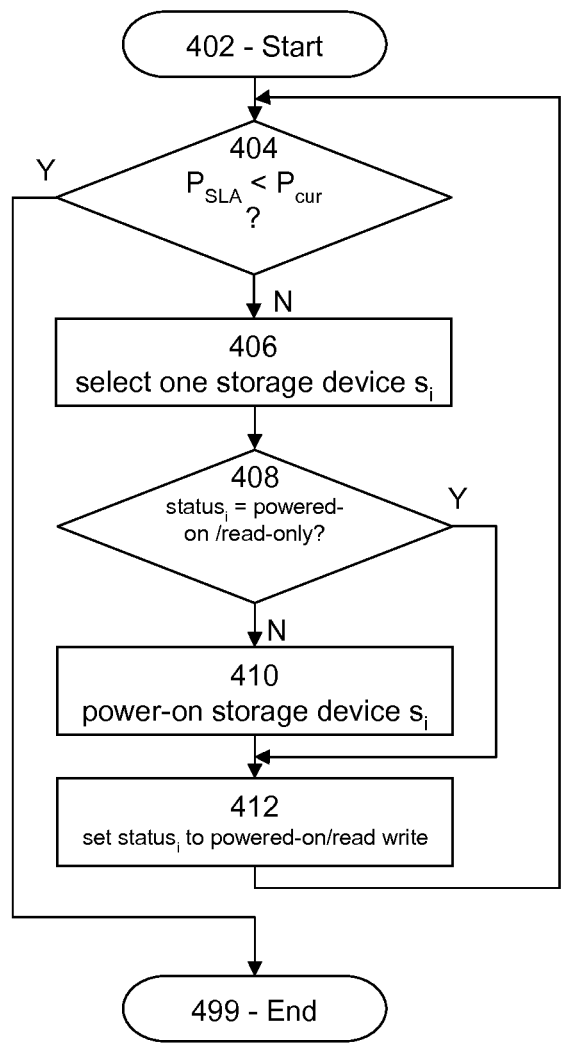
Figure 2:
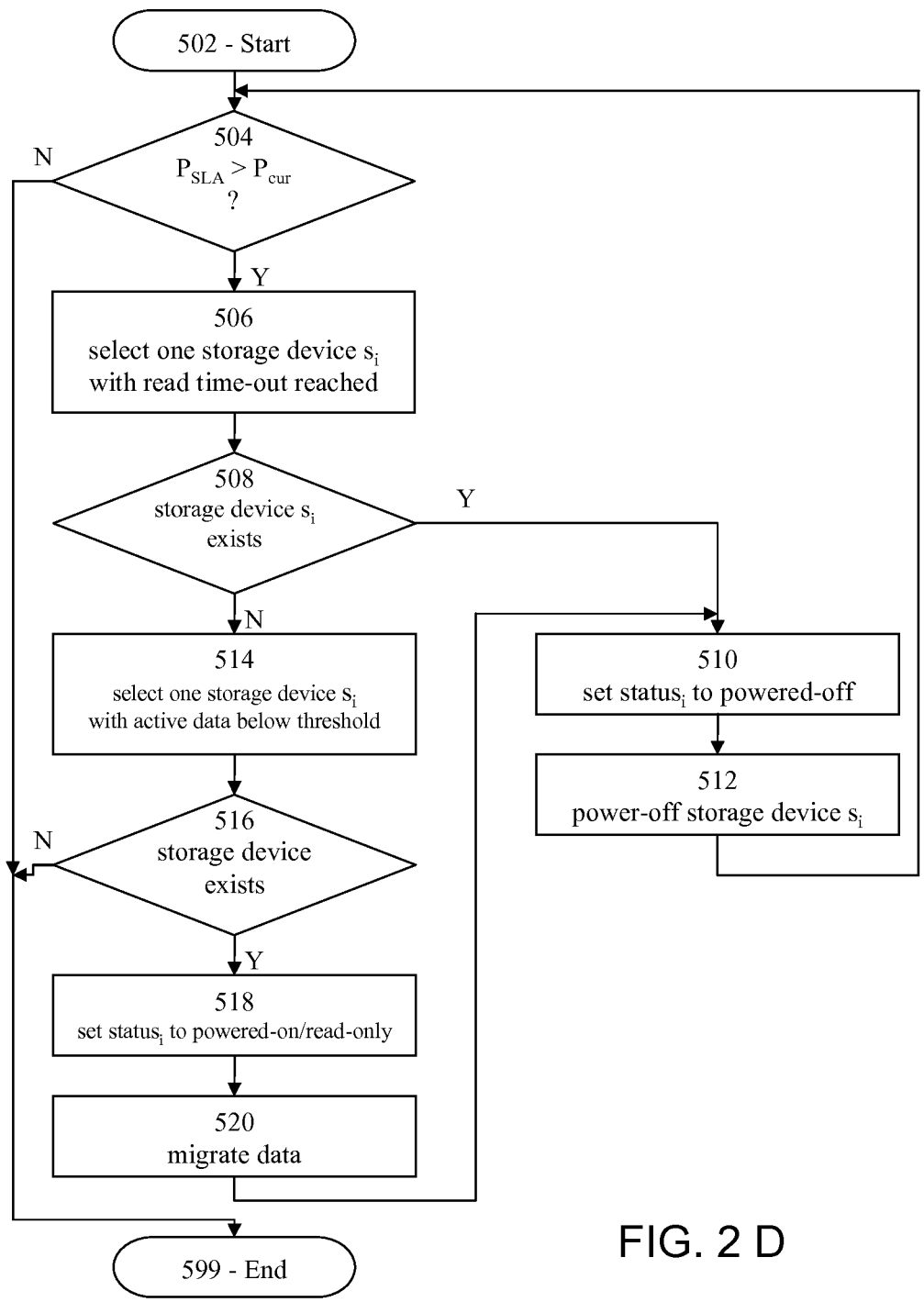
Figure 2:
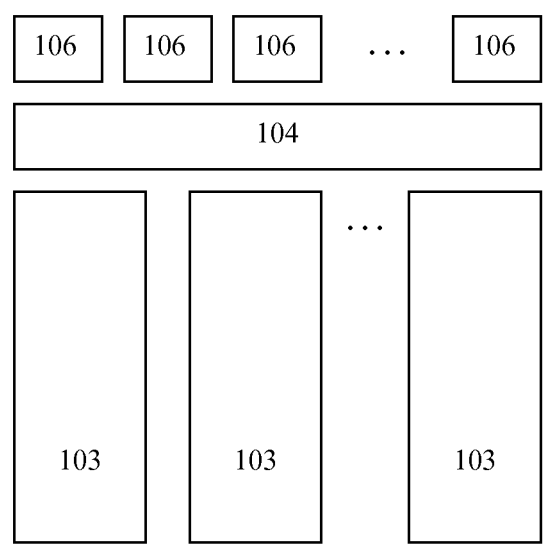

FIG. 2 B shows the flow of process 300 for serving a write request of host computer 106. The process 300 starts in step 302 where the write command such as a SCSI WRITE (10) command is received from a host system and flows to step 304.

In step 304, the storage virtualization system 104 uses prior art to select one or more storage resources $s_i$ to serve the write request. The storage virtualization system 104 may select more than one storage resource $s_i$ to create additional data copies of the data received as part of the write command. Associated functions such as remote mirroring, replication or RAID1 are according to prior art. The storage virtualization system 104 starts for each selected storage resource $s_i$ receiving a data copy a separate sub-process which begins at step 306.

In step 306, the storage virtualization system 104 checks whether the status $status_i$ of the storage resource $s_i$ which was selected in step 304 to write the data is powered-on/read-write. If the decision in step 306 evaluates to YES, the storage resource $s_i$ which was selected in step 304 to write the data is powered-on and eligible for writing data. The process continues at step 314 which is explained later. If the decision in step 306 evaluates to NO, the storage resource $s_i$ which was selected in step 304 to write the data is not eligible for writing data. Its status $status_i$ is either powered-off or powered-on/read-only. The process flows to step 308.

In step 308, the storage virtualization system 104 determines an alternative storage resource $s_j$ for serving the write request. The selection of the alternative storage resource $s_j$ must adhere to prior art: For instance it must take into account the requirements for RAID striping to satisfy high performance needs or the requirements for storing copies on different storage resources 102 to provide high availability. In addition to that, the storage virtualization system 104 can take additional parameters pertaining to storage resource $s_j$ into account such as the parameters $pc_j$, $p_j$, $status_j$, $tr_j$, $to_j$, $c_j$, $u_j$, $a_j$, and $at_j$ defined above to increase the power-efficiency of the overall solution. For example it may select the storage resource $s_j$ with the least utilization $u_j$ in order to balance the capacity across storage resources. Or it may select the storage resource with the highest utilization in order to fill it up first because this would ensure that such device only serves read requests subsequently. For performance reasons the storage resource may be selected which has the least activity ratio $a_j$. Once the alternative storage resource $s_j$ for writing the data is selected, the process flows to step 310. In an alternative embodiment, process 400 can be started to power-on additional storage resources, if no eligible storage resource haven been found.

In step 310, the storage virtualization system 104 updates the allocation table for the storage resource $s_j$ which was selected in step 308 to mark the respective storage area as used. In addition to that the virtualization instance 104 discards the old copy of the data and de-allocates the respective storage area on storage resource $s_i$, which was determined in step 304 to keep the old copy of data. The flow continues at step 312.

In step 312, the storage virtualization system 104 updates the mapping table to map the logical storage to the new location determined in step 308. The flow continues in step 314.

In step 314, the storage virtualization system 104 writes the data to the respective storage resource $s_i$ or $s_j$ as indicated in the mapping table. The flow continues at step 316.

Step 316 is optional. If step 304 starts only one sub-process because only one copy of the data is required, then step 316 can be omitted. If multiple sub-processes are started then prior art can be used to determine when to proceed: For disaster protection reasons, the virtualization instance 106 may wait, until all sub-processes are completed. This represents a synchronous mirroring function where all data copies are written before the command is completed. Alternatively the storage virtualization system 104 may continue, when the first sub-process completed and create the other data copies later. This represents the asynchronous mirroring function. Whether the synchronous or asynchronous mirroring function is used is determined either based on the configuration of the virtualization instance or depends on other system or user defined policies. Once a sufficient amount of sub-processes completed, the flow continues at step 318.

In step 318, the storage virtualization system 104 confirms the write request to the host computer 106. The process 300 ends in step 399.

FIG. 2 C shows the process 400 for increasing the number of powered-on devices in order to favor the performance requirements. The process 400 can be started regularly on a time-based schedule or it can be started manually by an administrator. The process 400 can also be started based on events, for instance when a storage resource 102 reaches 100% utilization. The process 400 starts in step 402 and flows to step 404.

In step 404, the storage virtualization system 104 determines the set of storage resources which have the status powered-on/read-write and which have a utilization $u_i<100\%$ to calculate the current performance ($P_{cur}$). If $P_{cur}$ is larger than $P_{SLA}$ then a sufficient amount of storage resources is powered-on and the process 400 ends at step 499. $P_{SLA}$ is configurable within the storage virtualization system 104 may represent a fraction of $P_{max}$. If the decision in step 404 evaluates to NO, more storage resources must be powered-on and the process flows to step 406.

In step 406, the storage virtualization system 104 selects a storage resource $s_i$ to be powered-on. Thereby the storage virtualization system 104 first determines the set of storage resources 102 with an utilization lower 100% and which are in state powered-off or in state "powered-on/read-only". If this set is empty then the all storage resources are powered-on and the process 400 ends. If the set contains more then one storage resource 102 the storage virtualization system 104 uses priorities to select one of the storage resources 102. The storage virtualization system 104 can take additional environmental conditions into account such as the parameters $pc_j$, $p_j$, $status_j$, $tr_j$, $to_j$, $c_j$, $u_j$, $a_j$, and $at_j$ defined above to determine the priority of each storage resource 102. For example it may select the storage resource $s_j$ with the least utilization $u_j$ in order to balance the capacity across storage resources. Or it may select the storage resource with the highest utilization in order to fill it up first because this would ensure that such device only serves read requests subsequently. For performance reasons the storage resource may be selected which has the least activity ratio $a_j$. Once a specific storage resource $s_i$ is selected, the process flows to step 408.

In step 408, the storage virtualization system 104 checks, whether the status $status_i$ of the storage resource $s_i$ determined in step 406 is "powered-on/read-only". If the decision in step 408 evaluates to YES, the process flows to step 412 explained later. If the decision in step 406 evaluates to NO, the storage resource $s_i$ selected in step 406 has status $status_i$ powered-off and the process flows to step 410.

In step 410, the storage virtualization system 104 powers-on the storage resource $s_i$ which was selected in step 406. The flow continues at step 412.

In step 412, the storage virtualization system 104 sets the status $status_i$ of the storage resource $s_i$ which was selected in step 406 to status "powered-on/read-write". The flow continues at step 404 for an additional iteration of this process 400.

FIG. 2 D shows the flow of process 500 for decreasing the number of powered-on storage resources in order to favor the power savings. The process 500 can be started regularly on a time-based schedule, automatically by the invention in case a predefined total power consumption threshold for all powered-on storage resources $\Sigma(pc_i)$ is exceeded or it can be started manually by an administrator. The process 500 can also be started based on events, for instance when a storage resource 102 is powered-on by process 200 which serves read requests. The process 500 starts in step 502 and flows to step 504.

In step 504, the storage virtualization system 104 determines the amount of storage resources 102 which have the status "powered-on/read-write" and have a utilization <100% to calculate the current performance ($P_{cur}$). Then it is checked, if $P_{cur}$ is smaller than $P_{SLA}$. If the decision in step 504 evaluates to YES, a sufficient amount of storage resources is powered-off and the process 500 ends at step 599. If the decision in step 504 evaluates to NO, more storage resources must be powered-off and the process flows to step 506.

In step 506, the storage virtualization system 104 determines the set of storage resources which have the status of "powered-on/read-write" and the last read requests to that device (represented by $tr_i$) is longer ago than its read time out $to_i$. If there are two or more storage resource 102 which have passed its read timeout $to_j$, than the storage virtualization system 104 selects one of them. In one embodiment the storage virtualization system 104 selects the storage resource $s_i$ where the difference between the time $tr_i$ and $to_i$ is greatest. In an alternate embodiment the storage virtualization system 104 selects the storage resource $s_i$ with the oldest read request $tr_i$. In yet an alternate embodiment the storage virtualization system 104 takes additional environmental conditions into account such as the parameters $pc_j$, $p_j$, status, $tr_j$, $to_j$, $c_j$, $u_j$, $a_j$, and $at_j$ defined above to select a storage resource $s_i$. For example it may select the storage resource $s_j$ with the least utilization $u_j$ in order to balance the capacity across storage resources. Or it may select the storage resource with the highest utilization in order to fill it up first because this would ensure that such device only serves read requests subsequently. For performance reasons the storage resource may be selected which has the least activity ratio $a_j$. As the result of this step 506 one or zero storage resource $s_i$ are selected. The process flows to step 508.

In step 508, the storage virtualization system 104 checks whether in step 506 a storage resource $s_i$ could be identified which has passed the read timeout $to_i$. If the decision in step 508 evaluates to NO, then no storage resource $s_i$ has passed its read time-out $to_i$ and the process continues at step 514 which is explained later. If the decision in step 508 evaluates to YES, then one or more storage resource $s_i$ have passed its read timeout $to_i$ and step 506 selected one of them. The process continues at step 510.

In step 510, the storage virtualization system 104 sets the status, of the storage resource $s_i$ which was selected in step 506 to status powered-off. The flow continues at step 512.

In step 512, the storage virtualization system 104 powers-off the storage resource $s_i$ which was selected in step 506. The flow continues at step 504 for an additional iteration of this process 500.

In step 514, the storage virtualization system 104 searches for storages devices $s_i$ which have an activity $a_i$ below their activity threshold $at_i$. If there are two or more storage resource $s_i$, which are below their activity threshold, than, the storage virtualization system 104 selects one of them. In one embodiment the storage virtualization system 104 selects the storage resource which has the lowest activity $a_i$. In an alternate embodiment the storage virtualization system 104 selects the storage resource 102 where the difference between activity $a_i$ and activity threshold $at_i$ is greatest. In an alternate embodiment the storage virtualization system 104 takes additional environmental conditions into account such as the parameters $pc_j$, $p_j$, $status_j$, $tr_j$, $to_j$, $c_j$, $u_j$, $a_j$, and $at_j$ defined above to select a storage resource $s_i$. As the result of this step one or zero storage resource $s_i$ are selected. The process flows to step 516.

In step 516, the storage virtualization system 104 checks whether in step 514 a storage resource $s_i$ has been selected which has an activity $a_i$ below its activity threshold $at_i$. If the decision in step 508 evaluates to NO, then no storage resource $s_i$ has an activity $a_i$ below its activity threshold $at_i$. The storage virtualization system 104 issues an error to the administrator and the process 500 ends in step 599. If the decision in step 516 evaluates to YES, then at least one storage resource $s_i$ has an activity $a_i$ below its activity threshold $at_i$ and step 514 selected one of them. The process continues at step 518.

In step 518, the storage virtualization system 104 sets the status $status_i$ of the storage resource $s_i$ which was selected in step 514 to "powered-on/read-only". The flow continues at step 520.

In step 520, the storage virtualization system 104 migrates the active data of the storage resource $s_i$, which was selected in step 514. Migration means that the data is read of the storage resource $s_i$ and written to another storage resource, which is in "power-on/read-write" status utilizing process 300. In one embodiment the storage virtualization system 104 creates an additional copy of the data, which was read within the read time-out interval to, to another storage resource 102 utilizing process 300 and updates the mapping table and the allocation table. In an alternate embodiment the storage virtualization system 104 copies the data which was read within the read time-out interval and copies it to another storage resource 102 utilizing process 300. Then the storage virtualization system 104 deletes the data on the storage resource which was selected in step 514 and updates the mapping table and the allocation table accordingly. In an alternate embodiment the storage virtualization system 104 fills up the free storage capacity of storage resource $s_i$ with inactive data of other storage resources 102 to consolidate inactive data on as few storage resources as possible. The process continues at step 510 explained earlier.

FIG. 2 E shows a scenario where a single storage system 103 provides multiple storage resources 102 to the storage virtualization system 104. Such a storage system 103 can be, for instance, a disk subsystem such as an IBM® DS8000 which provides multiple logical volumes as storage resources 102 to the storage virtualization system 104. The presented processes 200, 300, 400, 500 can be easily adopted to power-on and power-off complete disk subsystems. This is especially advantageous since this saves even more energy than just powering on and of storage resources 102.

This invention is also not limited to network based storage virtualization. It could also be implemented inside the storage subsystem 103.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method optimized power savings in a storage virtualization system a processor device in a computing environment, the method comprising:
    creating first meta data for physical resources which describes a power status of a storage resource in one of a powered-on/read-write, powered-on/read only, and powered-off power state;
    creating second meta data for each of the physical storage resources which determines an actual performance of the physical storage resources and which supports optimization of a powering-on and a powering-off of the physical storage resources; and
    executing a write request from one of a host and application to logical and virtual storage resource by performing the following:
        determining a current physical target storage resource by evaluating a mapping table, determining the power-status of the physical storage resource based on one of the first and second meta data, selecting a new target physical storage resource which is in the power state powered-on/read-write if the new target physical storage resource is one of powered-off and powered-on/read-only, updating the mapping table to map a virtual resource to the new physical target resource, configuring an optimized set of the physical storage resources to be in the powered-on/read-write power status by creating a performance target for the optimized set of the physical storage resources to be in the powered-on/read-write power status, and determining the actual performance of the optimized set of the physical storage resources to be in the powered-on/read-write power status and a first background process which initiates a power-on on at least one of the physical storage resources if the performance target is below a determined current performance and a second background process which initiates a power-off of the at least one of the physical storage resources if the performance target is above the determined current performance.

2. The method of claim 1, wherein the second meta data describes characteristics of each of the physical storage resources including at least a power consumption, a performance, a time stamp of a last read request, a time-out interval for the last read request, capacity, a utilization, an activity ratio, an activity threshold, wherein the activity ratio is defined as the amount of data which is read from the physical storage resources within the time-out interval of the physical storage resources.

3. The method of claim 1, further including, in conjunction with the first background process, performing the following:

selecting at least one of the physical storage resources in one of the powered-off power state and in power-on/read-only power state, initiating the powering-on of a selected one of the physical storage resources if the power status is in the powered-off power state, setting the power status of the selected one of the physical storage resources to the powered-on/read-write power state, updating the determined current performance, and continuously performing the selecting, initiating, setting, and updating if the performance target is below the updated determined current performance.

4. The method of claim 1, further including, in conjunction with the second background process, performing the following:

selecting at least one of the physical storage resources in the powered-on/read-write power state and which exceeded the time-out interval for the last read request, setting the power status of the selected one of the physical storage resources to the powered-off power state, initiating the powering-off of the selected one of the physical storage resources, updating the determined current performance, and continuously performing the selecting, initiating, setting, and updating if the performance target is above the updated determined current performance.

5. The method of claim 4, further including performing the following:

selecting at least one of the physical storage resources in the powered-on/read-write power state having a current activity ratio is below the activity threshold for the at least one of the physical storage resources, setting the power status of the selected one of the physical storage resources to the powered-on/read-write power state, migrating active data to an alternative one of the at least one of the physical storage resources which is in the powered-on/read-write power state, updating the mapping table to map the virtual resource to the new target physical storage resource, and powering-off the selected one of the physical storage resources.

6. The method of claim 1, further including, wherein the storage virtualization system comprises a virtualization controller which manages storage capacity on a plurality of storage resources and presents the plurality of storage resources as one of a logical and a virtual storage resources to one of hosts and applications and the plurality of storage resources, and a mapping table for mapping the virtual storage resources to the physical storage resources, wherein the power-on power state and the power off power state of the physical storage resources is optimized.

7. A system for optimized power savings in a storage virtualization system in a computing environment, comprising:

a virtualization controller, wherein the virtualization controller is adapted to manages storage capacity on a plurality of storage resources and presents the plurality of storage resources as one of a logical and a virtual storage resources to one of hosts and applications and the plurality of storage resources;

a mapping table in communication with the virtualization controller, wherein the mapping table is adapted to map the virtual storage resources to the physical storage resources and at least one processor device in communication with the virtualization controller and the mapping table, wherein the processor devices is adapted for:

creating first meta data for physical resources which describes a power status of a storage resource in one of a powered-on/read-write, powered-on/read only, and powered-off power state, creating second meta data for each of the physical storage resources which determines an actual performance of the physical storage resources and which supports optimization of a powering-on and a powering-off of the physical storage resources, and executing a write request from one of a host and application to logical and virtual storage resource by performing the following:

determining a current physical target storage resource by evaluating a mapping table, determining the power-status of the physical storage resource based on one of the first and second meta data, selecting a new target physical storage resource which is in the power state powered-on/read-write if the new target physical storage resource is one of powered-off and powered-on/read-only, updating the mapping table to map a virtual resource to the new physical target resource, configuring an optimized set of the physical storage resources to be in the powered-on/read-write power status by creating a performance target for the optimized set of the physical storage resources to be in the powered-on/read-write power status, and determining the actual performance of the optimized set of the physical storage resources to be in the powered-on/read-write power status and a first background process which initiates a power-on on at least one of the physical storage resources if the performance target is below a determined current performance and a second background process which initiates a power-off of the at least one of the physical storage resources if the performance target is above the determined current performance.

8. The system of claim 7, wherein said second meta data describes characteristics of each of the physical storage resources including at least a power consumption, a performance, a time stamp of a last read request, a time-out interval for the last read request, capacity, a utilization, an activity ratio, an activity threshold, wherein the activity ratio is defined as the amount of data which is read from the physical storage resources within the time-out interval of the physical storage resources.

9. The system of claim 7, wherein the processor device is further adapted for, in conjunction with the first background process, performing the following:
  selecting at least one of the physical storage resources in one of the powered-off power state and in power-on/read-only power state,
  initiating the powering-on of a selected one of the physical storage resources if the power status is in the powered-off power state,
  setting the power status of the selected one of the physical storage resources to the powered-on/read-write power state,
  updating the determined current performance, and
  continuously performing the selecting, initiating, setting, and updating if the performance target is below the updated determined current performance.

10. The system of claim 7, wherein the processor device is further adapted for, in conjunction with the second background process, performing the following:
  selecting at least one of the physical storage resources in the powered-on/read-write power state and which exceeded the time-out interval for the last read request,
  setting the power status of the selected one of the physical storage resources to the powered-off power state,
  initiating the powering-off of the selected one of the physical storage resources,
  updating the determined current performance, and
continuously performing the selecting, initiating, setting, and updating if the performance target is above the updated determined current performance.

11. The system of claim 10, wherein the processor device is further adapted for performing the following:
  selecting at least one of the physical storage resources in the powered-on/read-write power state having a current activity ratio is below the activity threshold for the at least one of the physical storage resources,
  setting the power status of the selected one of the physical storage resources to the powered-on/read-write power state,
  migrating active data to an alternative one of the at least one of the physical storage resources which is in the powered-on/read-write power state,
  updating the mapping table to map the virtual resource to the new target physical storage resource, and
  powering-off the selected one of the physical storage resources.

12. The system of claim 7, wherein the processor device is further adapted for reading all of the active files from the virtualization controller starting at the starting block address into the reclamation memory.

13. The system of claim 7, wherein the processor device is further adapted for writing active data files from the reclamation memory on the tape starting from one of the starting block address and the block address where a last write finished.

14. A computer program product for optimized power savings in a storage virtualization system by a processor device, the computer program product comprising a non-transitory computer-readable storage medium having computer-readable program code portions stored therein, the computer-readable program code portions comprising:
  a first executable portion for creating first meta data for physical resources which describes a power status of a storage resource in one of a powered-on/read-write, powered-on/read only, and powered-off power state;
  a second executable portion for creating second meta data for each of the physical storage resources which determines an actual performance of the physical storage resources and which supports optimization of a powering-on and a powering-off of the physical storage resources; and
  a third executable portion for executing a write request from one of a host and application to logical and virtual storage resource by performing the following:
    determining a current physical target storage resource by evaluating a mapping table,
    determining the power-status of the physical storage resource based on one of the first and second meta data,
    selecting a new target physical storage resource which is in the power state powered-on/read-write if the new target physical storage resource is one of powered-off and powered-on/read-only,
    updating the mapping table to map a virtual resource to the new physical target resource,
    configuring an optimized set of the physical storage resources to be in the powered-on/read-write power status by creating a performance target for the optimized set of the physical storage resources to be in the powered-on/read-write power status, and
    determining the actual performance of the optimized set of the physical storage resources to be in the powered-on/read-write power status and a first background process which initiates a power-on on at least one of the physical storage resources if the performance target is below a determined current performance and a second background process which initiates a power-off of the at least one of the physical storage resources if the performance target is above the determined current performance.

15. The computer program product of claim 14, wherein said second meta data describes characteristics of each of the physical storage resources including at least a power consumption, a performance, a time stamp of a last read request, a time-out interval for the last read request, capacity, a utilization, an activity ratio, an activity threshold, wherein the activity ratio is defined as the amount of data which is read from the physical storage resources within the time-out interval of the physical storage resources.

16. The computer program product of claim 14, further including a fourth executable portion for, in conjunction with the first background process, performing the following:

selecting at least one of the physical storage resources in one of the powered-off power state and in power-on/read-only power state, initiating the powering-on of a selected one of the physical storage resources if the power status is in the powered-off power state, setting the power status of the selected one of the physical storage resources to the powered-on/read-write power state, updating the determined current performance, and continuously performing the selecting, initiating, setting, and updating if the performance target is below the updated determined current performance.

17. The computer program product of claim 14, further including a fourth executable portion for, in conjunction with the second background process, performing the following:

selecting at least one of the physical storage resources in the powered-on/read-write power state and which exceeded the time-out interval for the last read request, setting the power status of the selected one of the physical storage resources to the powered-off power state, initiating the powering-off of the selected one of the physical storage resources, updating the determined current performance, and continuously performing the selecting, initiating, setting, and updating if the performance target is above the updated determined current performance.

18. The computer program product of claim 17, further including a fifth executable portion for performing the following:

selecting at least one of the physical storage resources in the powered-on/read-write power state having a current activity ratio is below the activity threshold for the at least one of the physical storage resources, setting the power status of the selected one of the physical storage resources to the powered-on/read-write power state, migrating active data to an alternative one of the at least one of the physical storage resources which is in the powered-on/read-write power state, updating the mapping table to map the virtual resource to the new target physical storage resource, and powering-off the selected one of the physical storage resources.

19. The computer program product of claim 15, wherein the storage virtualization system comprises a virtualization controller which manages storage capacity on a plurality of storage resources and presents the plurality of storage resources as one of a logical and a virtual storage resources to one of hosts and applications and the plurality of storage resources, and a mapping table for mapping the virtual storage resources to the physical storage resources, wherein the power-on power state and the power off power state of the physical storage resources is optimized.

* * * * *